(12) United States Patent  
Feng (10) Patent No.: US 8,000,586 B2
(45) Date of Patent: Aug. 16, 2011

(54) VIDEO PLAYER (75) Inventor: Jun Feng, Beijing (CN)

(73) Assignee: aigo Digital Technology Co., Ltd., Beijing (CN)

( * ) Notice: Subject to any disclaimer, the term of this patent is extended or adjusted under 35 U.S.C. 154(b) by 1727 days.

(21) Appl. No.: 11/222,044

(22) Filed: Sep. 9, 2005

(65) Prior Publication Data

US 2006/0051065 A1 Mar. 9, 2006

Related U.S. Application Data (63) Continuation-in-part of application No. PCT/CN03/00764, filed on Sep. 10, 2003.

(30) Foreign Application Priority Data

Mar. 11, 2003 (CN) .................................. 03 1 19761

(51) Int. Cl.
H04N 5/77 (2006.01)
H04N 5/765 (2006.01)
(52) U.S. Cl. .......................... 386/361; 386/200; 386/358
(58) Field of Classification Search .......................... None
See application file for complete search history.

(56) References Cited

U.S. PATENT DOCUMENTS

| 5,630,142 | A | 5/1997 | Crump et al. |
| 6,865,621 | B2 | 3/2005 | Iwata |
| 2001/0056509 | A1* | 12/2001 | Iwata .............................. 710/20 |
| 2002/0124121 | A1 | 9/2002 | Chen et al. |
| 2004/0001704 | A1* | 1/2004 | Chan et al. ....................... 386/96 |
| 2004/0258401 | A1* | 12/2004 | Wang et al. .................... 386/125 |

FOREIGN PATENT DOCUMENTS

| CN | 1 139 771 | 1/1997 |
| CN | 1 330 345 | 1/2002 |
| CN | 1 384 443 | 12/2002 |

* cited by examiner

Primary Examiner — Thai Tran
Assistant Examiner — Heather R Jones
(74) Attorney, Agent, or Firm — J.C. Patents (57) ABSTRACT The present invention discloses a video player, comprising a decoding and control unit for outputting decoded video and audio signals; a storing unit for storing an application software capable of working without starting a computer operation system; a video processing unit for processing decoded video signals outputted by the decoding and control unit; an audio processing unit for processing decoded audio signals outputted by the decoding and control unit; an Optical disc driver's multi-use control circuit for multi-use controlling a DVD Optical disc driver of the computer; and a switch unit for switching the video processing unit and the audio processing unit to be coupled to the display and the sound box after monitoring a shut-off signal of the computer, and in the meantime switching two outputs of DC power to the video player. In the present invention, by using a unique switch unit to process switching by monitoring the shut-off signal, hardware sources of a PC can be abundantly in use to make video of multimedia products play without turning on the PC, therefore avoids adding new operation program.

14 Claims, 7 Drawing Sheets

VIDEO PLAYER

FIELD OF THE INVENTION

The present invention relates to a video player capable of sharing an optical disc driver with a PC, in particular, to a video player playing multimedia when the PC is shut off.

BACKGROUND OF THE INVENTION

With the high development of computer industry, playing video medium with PC gets more and more widespread. When using PC to playing video, firstly, users have to start the computer operation system, enter the normal working desk and initialize all the components of the PC, and then the video can be played. Therefore the video can not be played when the PC is shut off, which wastes power, time and other resources. Although some existing solutions have made progress for these shortages, for example, two sets of computer operation systems are installed into the computer to process the working of PC and multimedia playing respectively with sharing some software sources, all these solutions is mainly under the state of power on, not satisfactory solutions. Suppose we can use some hardware sources such as Optical disc driver, screen display and sound box to play video medium independently under the state of power-off, the existing solutions should be greatly innovated. At present, there are not any related patent articles or technical articles found in searching.

SUMMARY OF THE INVENTION

The object of the present invention is to provide a video player capable of playing video medium independently with the PC's assistance under the state of PC's power off.

The video player of the present invention comprises: a decoding and control unit for receiving video and audio signals and then outputting decoded video and audio signals functioned by a control command; a storing unit for storing an application software capable of working without starting the computer operation system; a video processing unit for processing decoded video signals outputted by the decoding and control unit and outputting the decoded video signals to a display after processing without starting the computer operation system; an audio processing unit for processing decoded audio signals outputted by the decoding and control unit and outputting the decoded audio signals to a sound box after processing without starting the computer operation system; an Optical disc driver's multi-use control circuit for multi-use controlling the Optical disc driver of the computer; and a switch unit for switching the video processing unit and the audio processing unit to be coupled respectively to the display and the sound box after monitoring a shut-off signal of the computer, and in the meantime switching two outputs of DC power to the video player.

The storing unit of the video player comprises a SDRAM for storing temporary data and instruction transferred when processing application program; an EEPROM for storing the related information of producer; and a FLASH for storing the main program and instruction sets of video player.

The decoding and control unit comprises a 32-bit main controlling IC chip.

The switch unit comprises a plurality of relays for controlling multi-way on-off switches respectively, the feeder ear of the relay connects with DC power and the earth terminal connects in series with an electric switch which is on or off under the effect of control signals.

The present invention plays video of multimedia products with making the best of hardware sources of PC by using a unique switch unit to monitor the shut-off signal and then switch under the PC's power off condition, therefore avoids adding new operation program. And the present invention has reasonable structures and novel principles which satisfy the market.

DETAILED DESCRIPTION OF THE PREFERRED EMBODIMENTS

Figure 1:
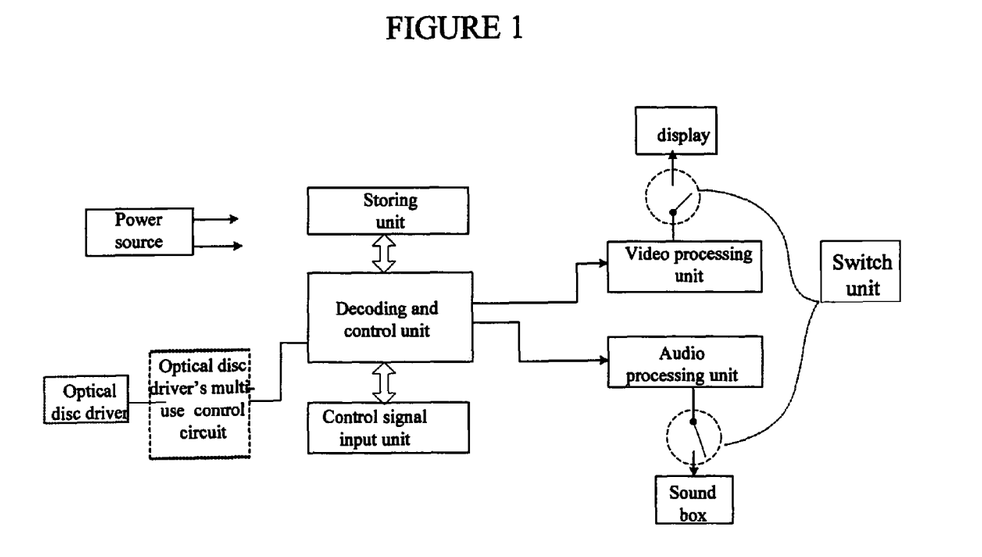
FIG. 1 is a structural drawing of the video player of the present invention.

The video player of the present invention is used to work together with PC. Under the state of PC's power off, we can use some hardware sources such as Optical disc driver, screen display, and sound box, to play video medium of multimedia products. The structure of the video player comprises a decoding and control unit, a storing unit, a video processing unit, an audio processing unit, an Optical disc driver's multi-use control circuit and a switch unit.

The decoding and control unit for receiving video and audio signals and outputting decoding the signals functioned by the control instruction; the receiving video and audio signals are got by reading the Optical disc driver. The control instruction can be input through pressing keys on the front panel of the video player or by a remote manipulator. The decoding and control unit adopts ALI M3325 main chip, a 32-bit main controlling IC chip.

The present invention needs to play video medium under the state of PC's power off, therefore the playing software, for processing playing after the input signals decoded by the decoding and control unit, should be pre-stored in the storing unit.

The storing unit of the video player comprises: a SDRAM for storing temporary data and instruction transferred when processing application program; an EEPROM for storing the related information of producer; and a FLASH for storing the main program and instruction sets of the video player.

The video processing unit for processing decoded video signals outputted by the decoding and control unit and outputting the decoded video signals to a display after processing without starting the computer operation system;

The audio processing unit for processing decoded audio signals outputted by the decoding and control unit and outputting the decoded video signals to a sound box after processing without starting the computer operation system;

The Optical disc driver's multi-use control circuit for multi-use controlling an Optical disc driver of the computer;

The switch unit switches the video processing unit and the audio processing unit to be coupled respectively to the display and the sound box, after monitoring a shut-off signal of the computer, and in the meantime switching two outputs of DC power to the video player. According to the working principle of the present invention, when PC starts, the switch unit switches the audio processing unit and the video processing unit to the screen display and sound box of the computer side. The Optical disc driver is a sub-device of the computer system in the present invention. When the switch unit monitors the shut-off signal of the computer, the Optical disc driver is used as a sub-device of the video player of the present invention. Thus, the Optical disc driver also needs the switch unit to switch basing on the monitored signal. The power source of the Optical disc driver is supplied by a plus 5V of a special power supply. The power source will be kept on supplying for the Optical disc driver whenever the computer is on or off until the video player is shut off. Therefore, the foregoing realizes a time dividing and multi-use control of the optical disc driver.

According to the foregoing, it can be concluded that a time dividing working model is used for the computer and the video player and the operation of the switch controlling part is described as follows.

When the computer is turned on to work normally, the switch unit cuts off the video player to be out of work.

When the computer is shut off normally, the switch unit begins switching to start up the decoding and control unit of the video player and at the same time the video processing unit and the audio processing unit are switched to the state of working. When the signal controlling input unit of the video player receives the controlling signals from key-pressing or remote controlling, the main chip ALI M3325 reads the MPEG-1, MPEG-2 data of the DVD driver and decodes them by IDE interface. And after the signals are amplified by the video and audio processing units, the video and audio signals are transmitted to the sound box and the display to be played respectively.

Figure 2:
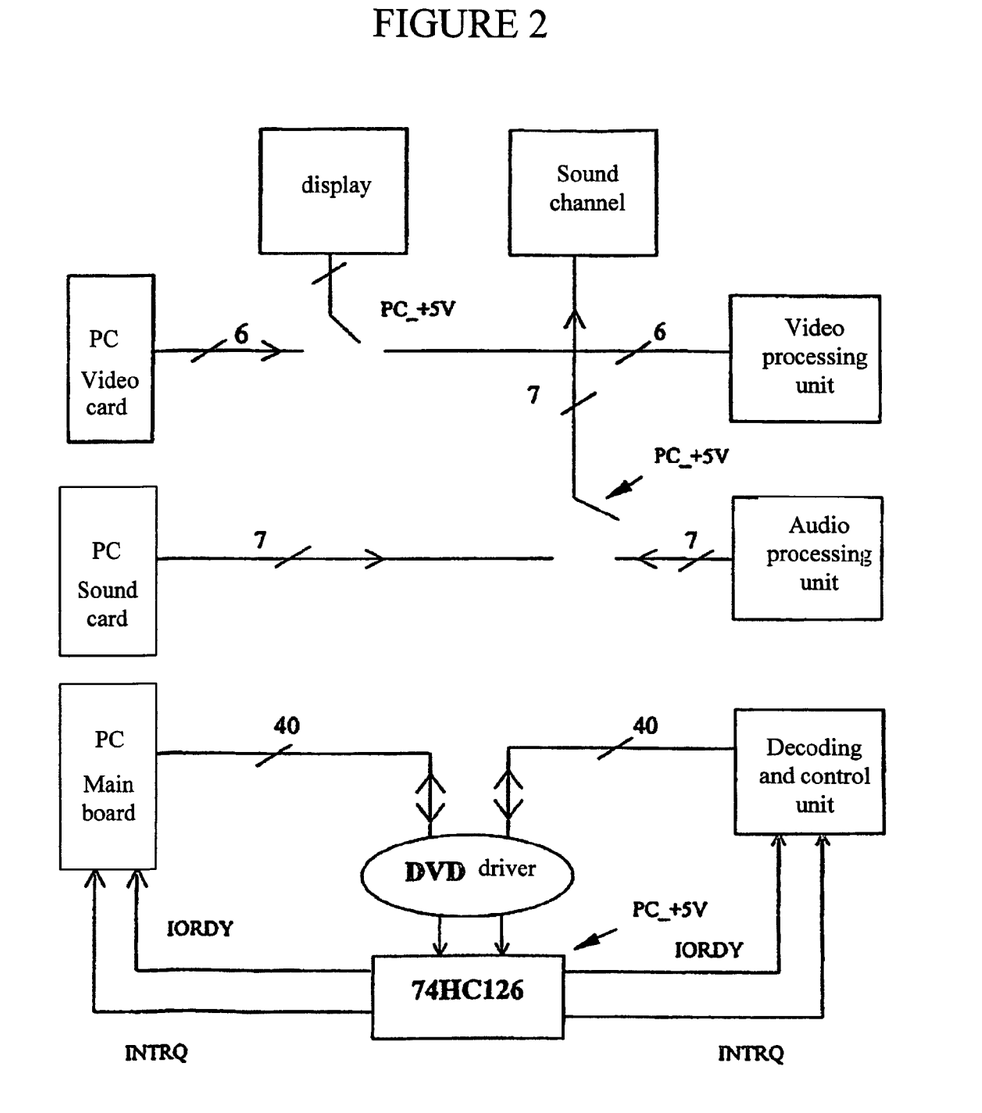
FIG. 2 is a schematic drawing of switching between the video player and PC.
Figure 3:
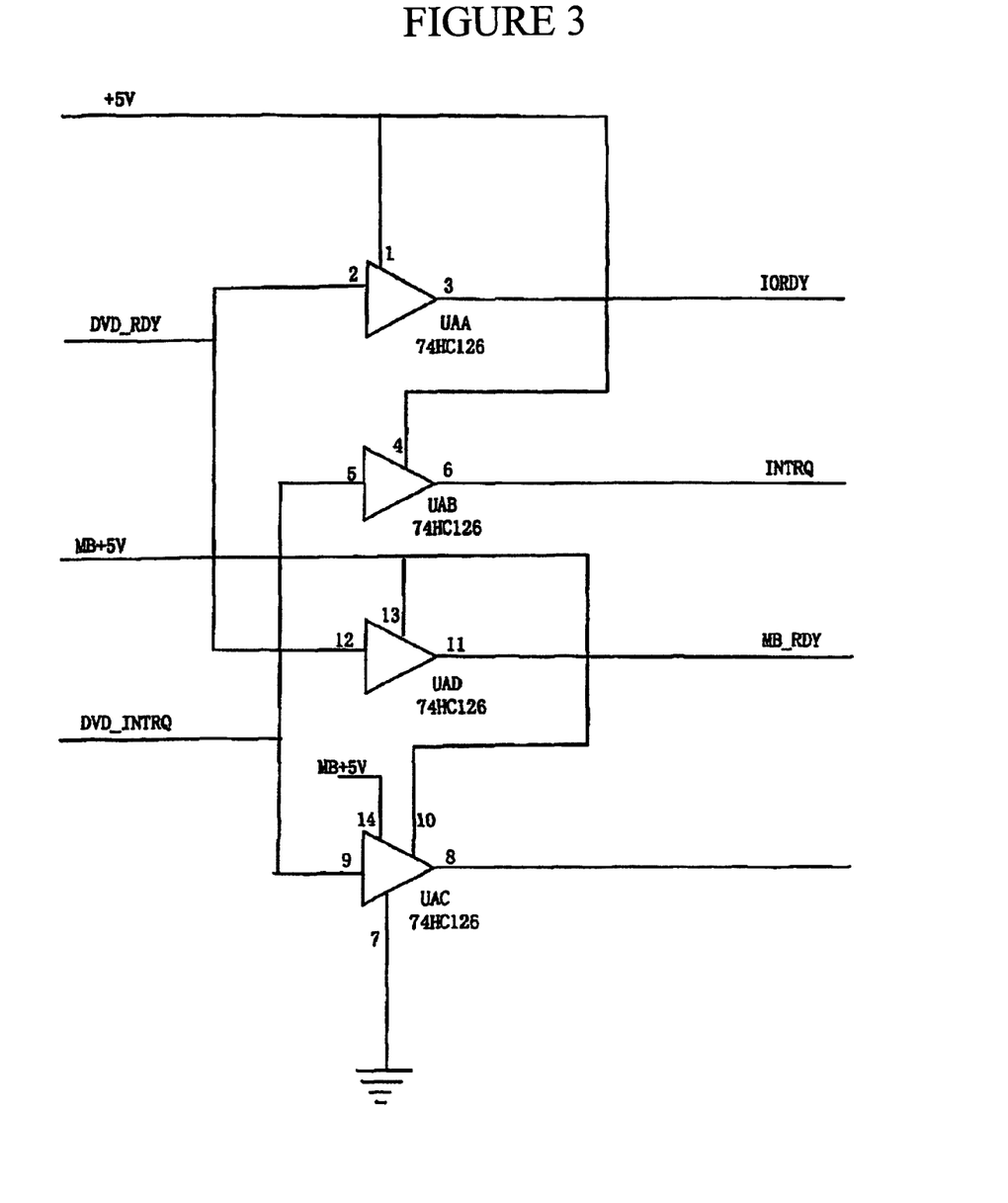
FIG. 3 is a schematic drawing of tri-state multi-use controlling principle of an Optical disc driver.

FIG. 2 is a schematic drawing of switching between the video player and PC of the present invention. The video player of the present invention contains three interfaces, which can be chosen to switch by the means of one as in two so that the Optical disc driver can be multi-used by the video player and PC. Showing in FIG. 1, The connection between the video processing unit and the screen display involves six circuit lines respectively representing R, G, B, H, V and ground signals. The connection between the audio processing unit and the sound box involves 7 circuit lines respectively representing left and right sound channels from audio channel 1 to audio channel 3, ground line and data and control signal line from IDE data line of the video player to DVD driver. All these lines will be switched by the means of one as in two of the switch unit or the Optical disc driver's multi-use control circuit. FIG. 3 shows a schematic drawing of the multi-use DVD driver, using a tri-state control circuit to multi-use control. The tri-state control circuit adopts 74HC 126 chip which has four tri-state control outputs.

When the computer is in the normal power-on state, the positive 5v of the main board is effective, but the positive 5v switched to the video player is null. Therefore, foot 8, foot 9, foot 11 and foot 12 of 74HC 126 are on state, and the two signals DVD_RDY and DVD_INTRQ of the DVD driver are effectively connected to MB_RDY and MB_INTRQ, i.e., the DVD driver is used as a signal input device of the computer; meanwhile, the foot 2, foot 3, foot 5 and foot 6 of 74HC 126 are in high resistance to be on off state.

When the computer is shut off normally, the positive 5v of the main board MB__+5V is null, but the positive 5v switched to the video player is effective. Therefore, foot 2, foot 3, foot 5 and foot 6 of 74HC126 are on state, and the two signals DVD_RDY and DVD_INTRQ of the DVD driver are effectively connected to IO_RDY and IN-TRQ, i.e., the DVD driver is used as a signal input device of the video player; meanwhile, foot 8, foot 9, foot 11 and foot 12 of 74HC 126 are in high resistance to be on off state.

It should be pointed out that the computer and the video player are the main devices, and the Optical disc driver is the sub-device. Due to using the above controlling, only one main device is allowed to operate the Optical disc driver at anytime, which guarantees the exclusiveness and reliability of the operation.

Figure 4:
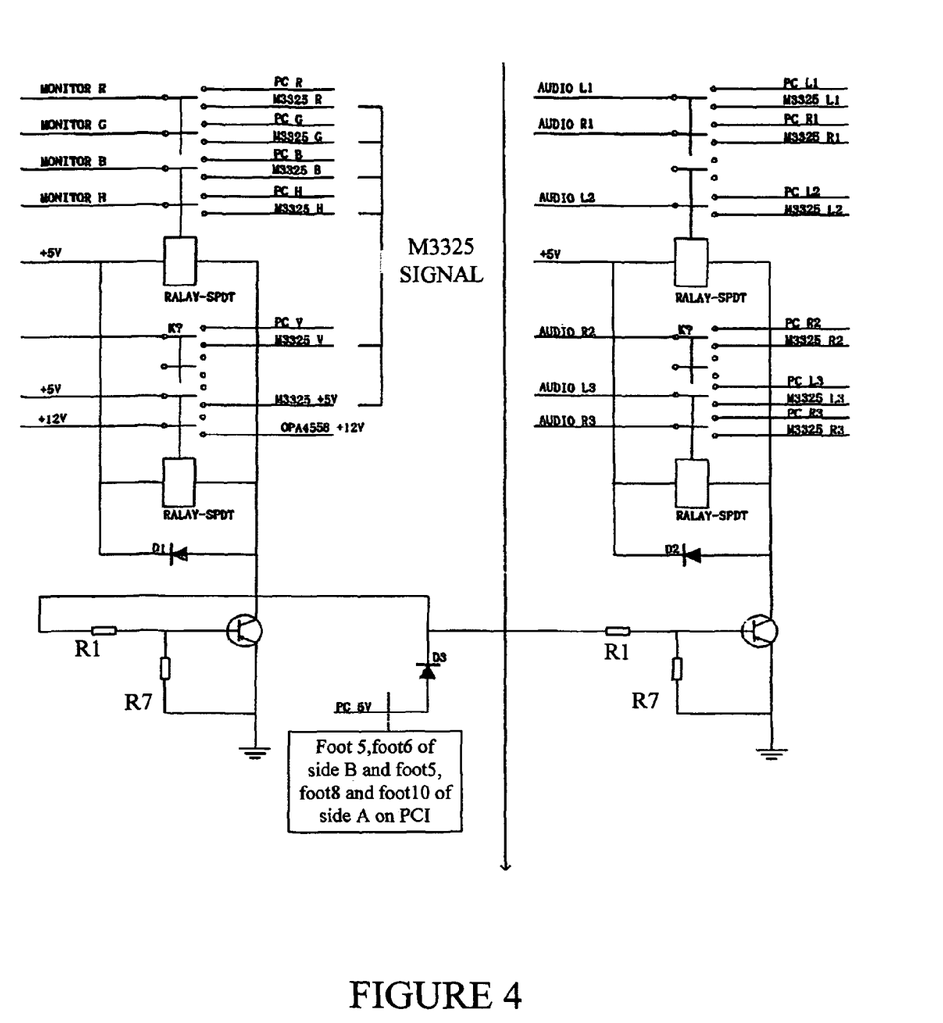
FIG. 4 is a circuit diagram of the switch unit.

FIG. 4 shows the circuit diagram of the switch unit. It can be seen in FIG. 4 that the switch unit consists of a plurality of super small relays; every relay has four groups of on-off, each group has two-way trigger points. The feeder ear of the relay is connected to the positive 5v voltage and the ground terminal is connected to the electric switch mainly consisting of dynatrons in series.

The constructer principle of switch part between the video part and the power sources in the switch unit is described as follows: setting two relays upper and lower, type of SPDT, each relay respectively controls four groups of on-off and each group has two trigger points. The switch part between the video and the power sources showing in FIG. 4, the four groups of on-off of the upper relay respectively correspond to signals R, G, B and H, and the first way trigger point of every group is connected to the personal computer side, the second way is connected to the video player side to ensure synchronized switching. Three groups of the four groups of on-off of the lower relay are used. The first group corresponds to signal V and the first way trigger point is connected to the PC side and the second way is connected to the decoding and control unit side. The second group is empty. The third group corresponds to DC+5v. The first way trigger point of the third group is empty, and the second way is connected to positive 5v of the video player for supplying the power for main controlling chip M3325 and other peripheral circuitry of the video player (e.g.+5v in FIG. 3 connected to foot 1 and foot 4, Please refer to FIG. 3). And the first way of the forth group is empty and the second way is connected to positive 12v voltage for supplying power for an audio operation amplifier chip OPA4558 of the audio processing unit.

The collector of the dynatron of the electric switch is coupled to the earth terminal of the relay, an emitter of the dynatron is coupled to the ground, and a resistance R7 is connected between the base electrode and the emitter, besides, the base electrode couples to one end of a resistance R1, and another end of the R1 couples to a cathode of a diode for receiving switch signals.

And the feeder ear and the earth terminal of the relay connect with a diode and the cathode of the diode couples to the feeder ear.

The principle of the audio switch is the same as the foregoing principle. Also uses two relays type of SPDF of upper and lower relay. Each relay controls four groups of on-off respectively and each group has two trigger points. The switch part between the audio and the power source showing in FIG. 3, only three groups of on-off of the upper relay are used. The first way trigger point of each group is connected to the PC side, the second way is connected to the video player side to ensure synchronized switching. The first group corresponds to the left channel of audio channel 1, the second one corresponds to the right channel of audio channel 1, the third one is empty, and the forth one corresponds to the left channel of audio channel 2. Only three groups of on-off of the lower relay are used. The first way trigger point of each group is connected to the PC side. And the second way is connected to the video player side. The first group corresponds to the right channel of audio channel 2, the second one is empty, and the third one corresponds to the left channel of audio channel 3, and the forth one corresponds to the right channel of audio channel 3.

The action of switching and controlling is triggered by the signal of power on or off, which is monitored by the electric switch mainly consisting of dynatron. When the computer is power-on, the slot I of the computer outputs positive 5v voltage. Said voltage is sent to the base electrode to electrify the dynatron so that the relay can work with normal power, and switch the display and the sound box to the computer side so that the computer controls the Optical disc driver to play the video medium; when the computer is shut-off, the output of the positive 5v voltage of the slot I of the computer disappears, thus the dynatron is under the state of being shut off and the relay's power supplying circuit is cut off so as to switch the second way trigger point to the video player side. Providing that the computer is under the state of power-off, the second way trigger point is always switched to the video player side.

The collector of the dynatron of the electric switch is coupled to the earth terminal of the relay, an emitter of the dynatron is coupled to the ground, and a resistance R7 is connected between the base electrode and the emitter, besides, the base electrode couples to one end of a resistance R1, and another end of the R1 couples to a cathode of a diode for receiving switch signals.

The Optical disc driver's multi-use control circuit of the present invention can be performed by another form of a tri-state circuit. Shown in FIG. 5, the tri-state circuit can control the DVD driver coupled to the PC main board side or the video player side alternatively. In this embodiment, the tri-state circuit consists of the 74HC4053 chips. A plurality of 74HC4053 chips connect to DVD driver's pins, IDE data line of the PC's main board and IDE data line of the decoding and control unit of the video player, and through the 74HC4053 chips, the signals sent out by the DVD driver are switched to the PC main board or the decoding and control unit of the video player.

Figure 5:
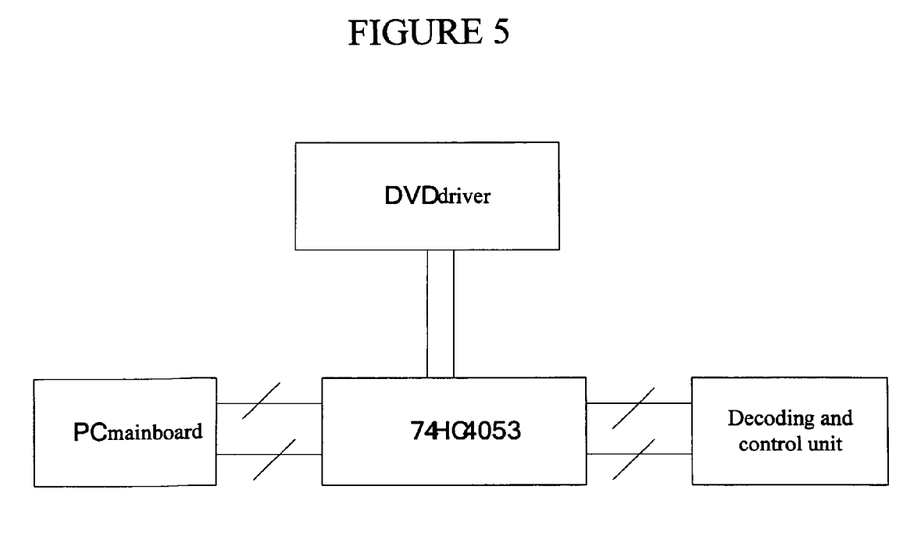
FIG. 5 is a schematic drawing of another tri-state multi-use controlling principle of Optical disc driver.

When the computer is in the normal power-on state, i.e. when the computer operation system is started, PC main board's MB__+5v is an effective voltage, simultaneity, the positive 5v of the video player are null. So the power supplied to the video player is null, and the control end of the 74HC4053 chip is on high tension, therefore the Optical disc driver is ducting with the IDE data line of the PC main board, and signals are sent to PC main board through the IDE interface.

When the computer is power off, i.e. the computer operation system doesn't start, PC main board's MB__+5v is null. So the power supplied to the PC main board is null, simultaneity, the positive 5v switched to the video player is effective, i.e. supplying power to the decoding and control unit of the video player. The control end of the 74HC4053 chip is on low tension. The Optical disc driver is closed with the IDE data line of the PC main board and is ducting with the IDE data line of the decoding and control unit of the video player. Signals are transmitted to the decoding and control unit of the video player through the IDE interface.

The control circuit for controlling the multi-use of the Optical disc driver in this embodiment can use other means of controlling circuit.

Figure 6:
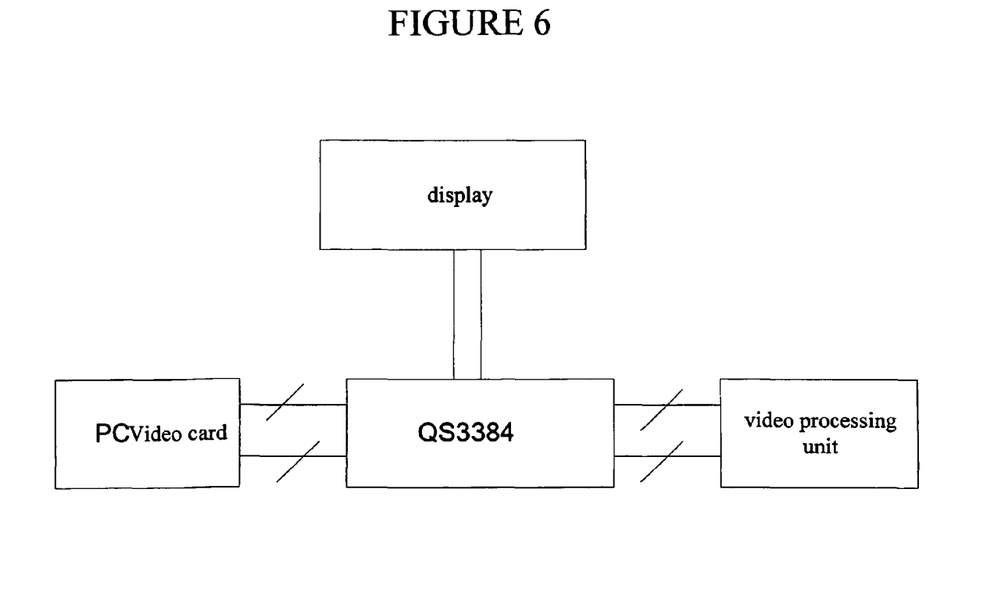
FIG. 6 is a module drawing of another embodiment of the video switch member.
Figure 7:
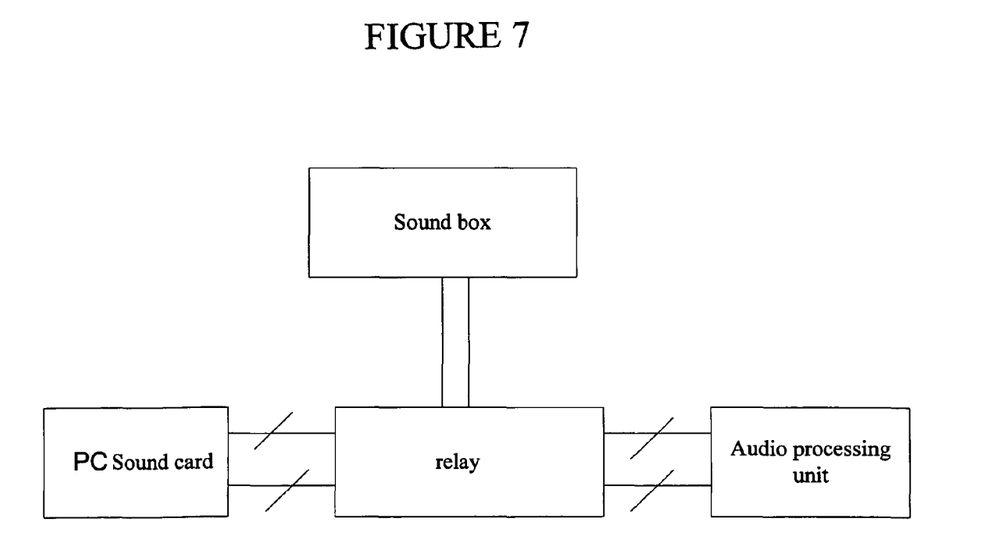
FIG. 7 is a module drawing of another embodiment of the audio switches member.

The switch unit of the present invention can use other means hereinafter described to perform switching of the audio input signals of the sound box and the video input signals of the display. FIG. 6 illustrates the module drawing of the video switching member. The change-over switch is made of QS3384 chip, coupled to computer display. The PC video card and the video processing unit of the video player may be connected to QS3384 alternatively. When the operation system of PC is working, the QS3384 chip is switched to the PC's video card side coupled to computer display via a tension controlling. Therefore, the video signals are provided to the computer display by PC video card. When the operation system of PC doesn't start, the video player is in working. The QS3384 chip is switched to the video processing unit side of the video player via a tension controlling. Therefore, the video signals are provided to the computer display by the video processing unit. FIG. 7 illustrates the module drawing of the video switching member. The change-over switch is made of a relay, and one end of the relay is coupled to the sound box. The PC sound card and the audio processing unit of the video player may be connected to the relay alternatively. When the operation system of PC is working, PC main board's MB__5v is an effective voltage; the relay is switched to the PC's sound card side coupled to the sound box. Therefore, the audio signals are provided to the sound box by PC audio card. When the operation system of PC doesn't start, i.e. the video player is in working, PC main board's MB__5v is null; the relay is switched to the audio processing unit side of the video player. Therefore, the audio signals are provided to the sound box by the audio processing unit.

It should be understood that the above embodiments are used only to explain, but not to limit the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A video player comprising:
   a decoding and control unit for receiving video and audio signals without starting an operation system of a computer and without powering a main board of the computer and then outputting decoded video and audio signals functioned by a control command;
   a storing unit for storing an application software capable of working without starting the operation system of the computer and without powering the main board of the computer;
   a video processing unit for processing decoded video signals outputted by the decoding and control unit and outputting the decoded video signals to a display after processing without starting the operation system of the computer and without powering the main board of the computer; and the video processing unit connecting the display by six circuit lines which represent signals R, G, B, H, V and ground signals respectively;
   an audio processing unit for processing decoded audio signals outputted by the decoding and control unit and outputting the decoded audio signals to a sound box after processing without starting the operation system of the computer and without powering the main board of the computer; and the audio processing unit connecting the sound box by 7 circuit lines which represent left and right sound channels from audio channel 1 to audio channel 3 and ground line respectively;
   an Optical disc driver's multi-use control circuit for multi-use control an Optical disc driver of the computer; and
   a switch unit for switching the video processing unit and the audio processing unit to be coupled to the display and the sound box after monitoring a shut-off signal of the computer, and in the meantime switching two outputs of DC power to the video player.

2. A video player according to claim 1, wherein the storing unit comprises:
a SDRAM for storing temporary data and instruction switched by processing an application program;
an EEPROM for storing related information of a producer; and
a FLASH for storing a main program and instruction set of the video player.

3. A video player according to claim 1, wherein the decoding and control unit comprises a 32-bit controlling IC chip.

4. A video player according to claim 1, wherein the Optical disc driver's multi-use control circuit adopts tri-state control circuit.

5. A video player according to claim 4 wherein the tri-state control circuit is a 74HC126 chip or a 74HC4053 chip.

6. A video player according to claim 1, wherein the switch unit comprises a video switch member and an audio switch member switching the display or the sound box respectively to a computer side or a video player side.

7. A video player according to claim 6, wherein the video switch member comprises two relays coupled connection which control multi-way on-off switches respectively, a feeder ear of the relay connects with DC power and an earth terminal connects in series with an electric switch which is on or off under the effect of control signals so that the relay produces switch signals to couple a trigger point to the computer side or the video player side.

8. A video player according to claim 7, wherein the electric switch comprises a dynatron, a collector of which is coupled to the earth terminal of the relay, an emitter of which is coupled to the ground, and a resistance R7 is connected between a base electrode and the emitter, besides, the base electrode couples to one end of a resistance R1, and another end of the resistance R1 couples to a cathode of a diode for receiving switch signals.

9. A video player according to claim 6, wherein the audio switch member comprises two relays coupled connection which control multi-way on-off switches respectively, the feeder ear of the relay connects with DC power and the earth terminal connects in series with the electric switch which is on or off under the effect of control signals so that the relay produces switch signals to couple the trigger point to the computer side or the video player side.

10. A video player according to claim 7, wherein the feeder ear and the earth terminal of the relay connect with a diode and the cathode of the diode couples to the feeder ear.

11. A video player according to claim 6, wherein the video switch member comprises two relays, which control four groups of on-off respectively and each group comprises two trigger points, the four groups of on-off in the first relay respectively correspond to signals R, G, B and H, a first way trigger point of every group is connected to the computer side, and a second way is connected to the video player side to ensure synchronized switching; in the four groups of on-off of the second relay, the first group corresponds to signal V and a first way trigger point is connected to the computer side and a second way trigger point is connected to the video player side, a second group is empty; a first way trigger point of the third group is empty, and the second way is connected to positive 5v of the video player for supplying power for a main controlling chip M3325 and other peripheral circuitry; and a first way of the forth group is empty and a second way is connected to positive 12v voltage for supplying power for the audio processing unit.

12. A video player according to claim 6, wherein the audio switch member comprises two relays, which control four groups of on-off respectively and each group comprises two trigger points, in the four groups of on-off of the first relay, a first way trigger point of every group is connected to the computer side, and a second way is connected to the video player side to ensure synchronized switching, and the first group corresponds to a left channel of audio channel 1, the second group corresponds to a right channel of audio channel 1; the third group is empty, and the forth group corresponds to a left channel of audio channel 2; in the second relay, a first way trigger point of each group is connected to the computer side, and a second way trigger point is connected to the video player side, the first group corresponds to signals of a right channel of audio channel 2, the second group is empty; and the third group corresponds to signals of a left channel of audio channel 3; and the forth group corresponds to signals of a right channel of audio channel 3.

13. A video player comprising:
a decoding and control unit for receiving video and audio signals without starting a computer operation system and then outputting decoded video and audio signals functioned by a control command;
a storing unit for storing an application software capable of working without starting the computer operation system;
a video processing unit for processing decoded video signals outputted by the decoding and control unit and outputting the decoded video signals to a display after processing without starting the computer operation system;
an audio processing unit for processing decoded audio signals outputted by the decoding and control unit and outputting the decoded audio signals to a sound box after processing without starting the computer operation system;
an Optical disc driver's multi-use control circuit for multi-use control an Optical disc driver of the computer; and
a switch unit for switching the video processing unit and the audio processing unit to be coupled to the display and the sound box after monitoring a shut-off signal of the computer, and in the meantime switching two outputs of DC power to the video player;
wherein the video processing unit and the display are connected by six circuit lines, which represent signals R, G, B, H, V and ground signals respectively; the audio processing unit and the sound box are connected by 7 circuit lines, which represent left and right sound channels from audio channel 1 to audio channel 3 and ground line respectively.

14. A video player comprising:
a decoding and control unit for receiving video and audio signals without starting an operation system of a computer and without powering a main board of the computer and then outputting decoded video and audio signals functioned by a control command;
a storing unit for storing an application software capable of working without starting the operation system of the computer and without powering the main board of the computer;
a video processing unit for processing decoded video signals outputted by the decoding and control unit and outputting the decoded video signals to a display after processing without starting the operation system of the computer and without powering the main board of the computer;

an audio processing unit for processing decoded audio signals outputted by the decoding and control unit and outputting the decoded audio signals to a sound box after processing without starting the operation system of the computer and without powering the main board of the computer;

an Optical disc driver's multi-use control circuit for multi-use control an Optical disc driver of the computer; and a switch unit for switching the video processing unit and the audio processing unit to be coupled to the display and the sound box after monitoring a shut-off signal of the computer, and in the meantime switching two outputs of DC power to the video player;

wherein the switch unit comprises a video switch member and an audio switch member switching the display or the sound box respectively to a computer side or a video player side;

wherein the video switch member comprises two relays coupled connection which control multi-way on-off switches respectively, a feeder ear of the relay connects with DC power and an earth terminal connects in series with an electric switch which is on or off under the effect of control signals so that the relay produces switch signals to couple a trigger point to the computer side or the video player side.

* * * * *